US012482127B2

(12) United States Patent
Ma et al.

(10) Patent No.: US 12,482,127 B2
(45) Date of Patent: Nov. 25, 2025

(54) DETERMINING BOUNDARIES OF BODY PARTS OF THREE-DIMENSIONAL AVATAR (71) Applicant: CLO VIRTUAL FASHION INC., Seoul (KR)

(72) Inventors: Jae Hwan Ma, Seoul (KR); Joo Seok Lee, Seoul (KR)

(73) Assignee: CLO Virtual Fashion Inc., Seoul (KR)

( * ) Notice: Subject to any disclaimer, the term of this patent is extended or adjusted under 35 U.S.C. 154(b) by 231 days.

(21) Appl. No.: 18/297,393

(22) Filed: Apr. 7, 2023

(65) Prior Publication Data

US 2023/0260146 A1   Aug. 17, 2023

Related U.S. Application Data (63) Continuation-in-part of application No. PCT/KR2022/018842, filed on Nov. 25, 2022.

(30) Foreign Application Priority Data

Nov. 25, 2021 (KR) .......... 10-2021-0164354
Nov. 23, 2022 (KR) .......... 10-2022-0158169

(51) Int. Cl.
 *G06T 7/64* (2017.01)
 *G06T 7/13* (2017.01)
 *G06T 19/20* (2011.01)

(52) U.S. Cl.
 CPC .......... *G06T 7/64* (2017.01); *G06T 7/13* (2017.01); *G06T 19/20* (2013.01);
 (Continued)

(58) Field of Classification Search
 None
 See application file for complete search history.

(56) References Cited

U.S. PATENT DOCUMENTS

2014/0347392 A1\* 11/2014 Odessky .......... A61B 5/1121
                                                              345/633
2016/0088284 A1   3/2016 Sareen et al.
(Continued)

FOREIGN PATENT DOCUMENTS

JP     6116784 B1   3/2017
KR   2014-0067259 A   6/2014
(Continued)

OTHER PUBLICATIONS

Extended European Search Report of the corresponding EP Application No. 22899085.9 mailed on Oct. 30, 2024.
(Continued)

*Primary Examiner* — Kent W Chang
*Assistant Examiner* — Jonathan M Cofino
(74) *Attorney, Agent, or Firm* — WTA IP Law P.C.

(57) ABSTRACT

According to an example embodiment, a method of determining a body part boundary surface of a three-dimensional (3D) avatar includes: generating curvature information including a curvature of each of a plurality of points present on a surface of the 3D avatar; determining, from among the plurality of points, first points of which a curvature satisfies a first predetermined criterion based on the curvature information; determining second points from among the first points based on whether a thickness corresponding to each of the first points determined based on thickness information of the 3D avatar satisfies a second predetermined criterion; and determining a plurality of body part boundary surfaces based on the second points.

19 Claims, 7 Drawing Sheets

(52) U.S. Cl.
CPC .............. *G06T 2207/30201* (2013.01); *G06T 2210/16* (2013.01); *G06T 2219/2016* (2013.01)

(56) References Cited

U.S. PATENT DOCUMENTS

| | | | |
|---|---|---|---|
| 2019/0108667 A1* | 4/2019 | Streuber | G06T 13/40 |
| 2022/0378329 A1* | 12/2022 | Ran | G06T 13/40 |

FOREIGN PATENT DOCUMENTS

| | | | |
|---|---|---|---|
| KR | 2014-0067295 A | 6/2014 | |
| KR | 2021-0019552 A | 2/2021 | |
| KR | 2021-0021890 A | 3/2021 | |
| KR | 2021-0118329 A | 9/2021 | |
| KR | 10-2328072 B1 | 11/2021 | |

OTHER PUBLICATIONS

S. Gauthier et al, "Digitized 3D mesh segmentation based on curvature analysis", Electronic Imaging, vol. 2017, No. 20, Jan. 29, 2017 (Jan. 29, 2017), pp. 33-38, XP055603726, US ISSN: 2470-1173.

Zou Kuansheng et al: "A 3D model feature extraction method using curvature-based shape distribution", 2015 12th International Conference on Fuzzy Systems and Knowledge Discovery (FSKD), IEEE, Aug. 15, 2015 (Aug. 15, 2015), pp. 1809-1813, XP032849782, DOI: 10.1109/FSKD.2015.7382221.

Jaehwan Ma et al. "Kinematic skeleton extraction from 3D articulated models" Journal of Elsevier: Computer-Aided Design 46 (2014) pp. 221-226, South Korea.

PCT International Search Report of PCT/KR2022/018842 mailed Feb. 27, 2023 by Korea Patent Office.

* cited by examiner

DETERMINING BOUNDARIES OF BODY PARTS OF THREE-DIMENSIONAL AVATAR

CROSS-REFERENCE TO RELATED APPLICATIONS

This is a bypass continuation of International Application No. PCT/KR2020/018842, filed on Nov. 25, 2022, which claims priority to Republic of Korea Patent Application No. 10-2021-0164354, filed on Nov. 25, 2021 and Republic of Korea Patent Application No. 10-2022-0158169, filed on Nov. 23, 2022, which are incorporated by reference herein in their entirety.

TECHNICAL FIELD

The following example embodiments relate to a method and device for determining a body part boundary of a three-dimensional (3D) avatar.

BACKGROUND ART

A three-dimensional (3D) garment simulation may drape a garment worn on an original avatar that is a 3D avatar over a target avatar that is another 3D avatar. The target avatar may be different from the original avatar currently wearing the garment in terms of pose, size, and mesh topology. Accordingly, there may be a need to modify the garment to be worn on the target avatar. In this case, a simulation device may dress the target avatar in the garment based on a relationship between the original avatar and the garment and a relationship between the original avatar and the target avatar. However, there may be various ways to dress the target avatar in the garment worn on the original avatar. In the field of garment simulation, there is a growing interest in research for dressing a target avatar in a garment worn on an original avatar.

SUMMARY

Embodiments relate to determining boundary surfaces of body parts of a three-dimensional (3D) avatar. Curvature information including a curvature of each of a plurality of points present on a surface of the 3D avatar is generated. First points of the 3D avatar at which curvature satisfies a first predetermined criterion based on the curvature information are determined. Second points of the 3D avatar is determined from among the first points based on whether a thickness corresponding to each of the first points determined based on thickness information of the 3D avatar satisfies a second predetermined criterion. A plurality of boundary surfaces of body parts are determined based on the second points.

In one or more embodiments, the curvature information includes information on Gaussian curvature. The Gaussian curvature is determined by multiplying a first curvature and a second curvature.

In one or more embodiments, the first predetermined criterion may include a criterion on whether the Gaussian curvature is a negative value.

In one or more embodiments, the thickness information indicates a radius of a sphere positioned inside the 3D avatar with at least one point in contact with the surface of the 3D avatar.

In one or more embodiments, the second predetermined criterion includes a criterion on whether the thickness is greater than or equal to a predetermined thickness.

In one or more embodiments, the second points are determined by determining a first point to be a second point when a thickness corresponding to the first point is greater than or equal to a predetermined thickness.

In one or more embodiments, before the generating of the curvature information, at least one end point is searched, starting from a start point of the 3D avatar, based on mesh information of the 3D avatar.

In one or more embodiments, a position of the at least one end point identified on the 3D avatar before the generating of the curvature information.

In one or more embodiments, a segment that is a body part of the 3D avatar is determined, based on the at least one end point and at least one of the plurality of boundary surfaces of body parts.

In one or more embodiments, at least one boundary surface of a body part in the segment is identified based on body proportion information.

In one or more embodiments, at least one boundary surface of a body part corresponding to a neck of the 3D avatar is determined from a plurality of cross sections parallel to a cross section determined based on shoulder position information of the 3D avatar. Alternatively. at least one boundary surface of the body part corresponding to the neck of the 3D avatar is identified from a plurality of cross sections parallel to a cross section determined based on face position information of the 3D avatar.

In one or more embodiments, a size of a 3D pattern of a garment to be worn on the 3D avatar is adjusted based on a size of each of the plurality of boundary surfaces of body parts.

In one or more embodiments, a size of a two-dimensional (2D) pattern corresponding to the 3D pattern is maintained.

DETAILED DESCRIPTION

The following structural or functional descriptions of example embodiments are merely intended for the purpose of describing the example embodiments, and the example embodiments may be implemented in various forms. The example embodiments are not intended to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first"

component may be referred to as a "second" component, or similarly, the "second" component may be referred to as the "first" component within the scope of the right according to the concept of the present disclosure.

It should be noted that if it is described that one component is "connected," "coupled," or "joined" to another component, a third component may be "connected," "coupled," and "joined" between the first and second components, although the first component may be directly connected, coupled, or joined to the second component. On the contrary, it should be noted that if it is described that one component is "directly connected," "directly coupled," or "directly joined" to another component, a third component may be absent. Expressions describing a relationship between components, for example, "between," "directly between," or "directly neighboring," etc., should be interpreted in a similar way.

As used herein, the singular forms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

Hereinafter, the example embodiments will be described in detail with reference to the accompanying drawings. When describing the example embodiments with reference to the accompanying drawings, like reference numerals refer to like components and a repeated description related thereto will be omitted.

Figure 1:
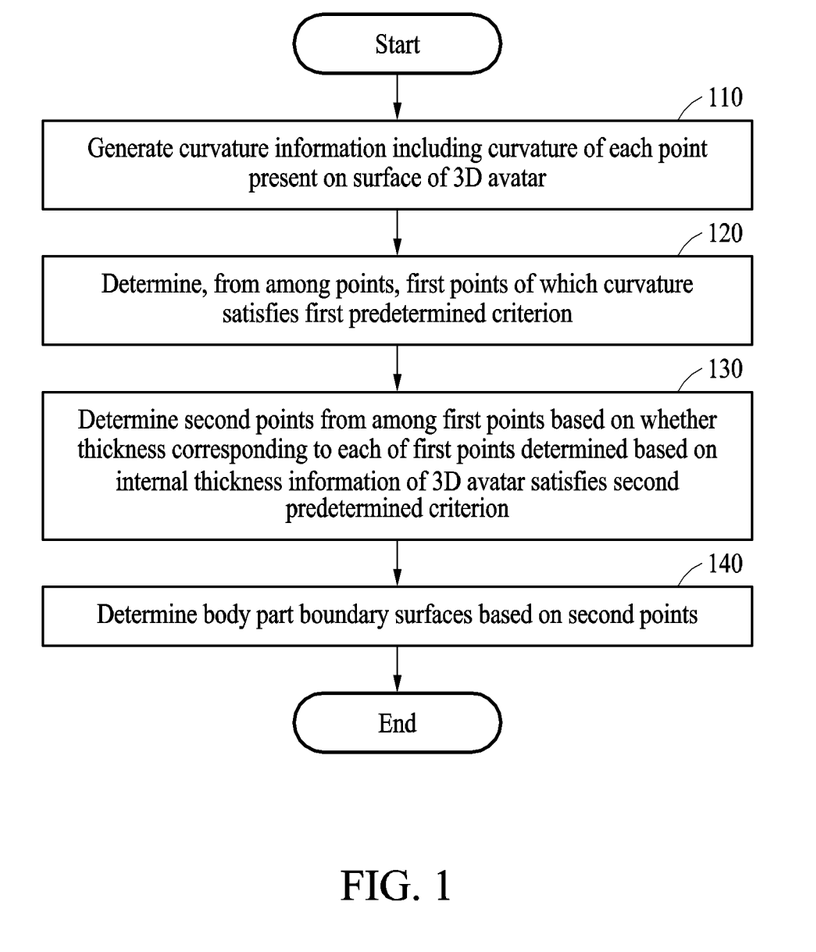
FIG. 1 is a flowchart illustrating a method of determining a body part boundary surface of a three-dimensional (3D) avatar, according to an example embodiment.

FIG. 1 is a flowchart illustrating a method of determining boundary surfaces of body parts of a three-dimensional (3D) avatar according to an example embodiment. According to an example embodiment, a simulation device 700 may dress a target avatar in a basic garment to dress the target avatar in a garment worn on an original avatar. The original avatar may be a 3D avatar that currently wears a garment, and the target avatar may be a 3D avatar over which the garment worn on the original avatar is to be draped. The basic garment may be a garment attached to a surface of a 3D avatar (or a garment closely attached to the surface of the 3D avatar). For example, the basic garment may be a garment attached to a human body, such as, for example, underclothes. The basic garment may be formed with at least one two-dimensional (2D) pattern. When the basic garment is worn on a 3D avatar, the simulation device 700 may simulate the basic garment in three-dimensional space. The basic garment may be formed with at least one mesh. In this case, a distance between vertices of the at least one mesh constituting the basic garment may be adjusted based on the size of the 3D avatar. For example, the simulation device 700 may dress the target avatar in the garment worn on the original avatar, based on a correlation between vertices of at least one mesh constituting a basic garment corresponding to the original avatar and vertices of at least one mesh constituting a basic garment corresponding to the target avatar.

According to an example embodiment, after dressing the original avatar in the basic garment, the simulation device 700 may generate relationship information between the basic garment and the garment worn on the original avatar. For example, the simulation device 700 may generate relationship information between a mesh of the basic garment and a mesh of the garment worn on the original avatar.

According to an example embodiment, the simulation device 700 may dress the target avatar in the basic garment worn on the original avatar. The simulation device 700 may then dress the target avatar in the garment based on the basic garment worn on the target avatar and the relationship information between the basic garment and the garment. For example, the simulation device 700 may dress the target avatar in the garment worn on the original avatar by applying the relationship information between the basic garment worn on the original avatar and the garment worn on the original avatar to the basic garment worn on the target avatar.

According to an example embodiment, the simulation device 700 may subdivide the basic garment by each body part of the 3D avatar to dress the target avatar in the basic garment. For example, the basic garment may be subdivided according to body parts such as the torso, arms, legs, and neck. To subdivide the basic garment for each body part, the simulation device 700 may extract a boundary surface for each body part of the target avatar. This is because a basic garment for each body part may be determined based on a boundary surface for each body part.

Hereinafter, a method by which the simulation device 700 extracts a body part boundary surface of a 3D avatar will be described in detail. According to an example embodiment, in operation 110, the simulation device 700 may generate curvature information including a curvature of each of a plurality of points present on a surface of a 3D avatar. The 3D avatar may be formed with a plurality of meshes. Also, each of the meshes may include points. For example, a triangular mesh may include three points, and a quadrangular mesh may include four points. Accordingly, a plurality of points may be present on the surface of the 3D avatar. The curvature information may include a curvature of each of the points present on the surface of the 3D avatar. The simulation device 700 may compute a curvature at a point present on the surface of the 3D avatar. The curvature information may include information based on a Gaussian curvature. The curvature information will be described in detail below with reference to FIG. 4.

According to an example embodiment, in operation 120, the simulation device 700 may determine, from the plurality of points, first points of which a curvature satisfies a first predetermined criterion based on the curvature information. The first predetermined criterion may be a criterion for extracting feature points from the surface of the 3D avatar. In the 3D avatar, degrees of the curvature at curved surfaces such as armpits and groin are different from that of other body parts. The simulation device 700 may identify such a characteristic based on the Gaussian curvature. Thus, the first predetermined criterion may be a criterion determined based on whether the Gaussian curvature is a negative value. For example, when a Gaussian curvature at one point is a negative value, the simulation device 700 may determine the point to be a first point. When a Gaussian curvature at another point is a positive value or zero (0), the simulation device 700 may not determine the point to be the first point.

According to an example embodiment, in operation 130, the simulation device 700 may determine second points from among the first points based on whether a thickness at each of the first points determined based on thickness information of the 3D avatar satisfies a second predetermined criterion. The thickness information may include a thickness of a cross section of a body part of the 3D avatar. For example, the cross section of the body part may include a surface perpendicular to a medial axis corresponding to a skeleton of the 3D avatar. The medial axis will be described in detail below with reference to FIG. 5. The thickness information may include, for example, the thickness of an arm, a leg, a neck, a torso, and the like of the 3D avatar.

The thickness information may indicate a radius of a sphere that is positioned inside the 3D avatar and includes at least one contact point in contact with the surface of the 3D avatar. The simulation device 700 may determine a size of a largest sphere that fits within a portion of the 3D avatar so that further increase in its size would cause to protrude beyond the 3D avatar. The thickness information will be described in detail below with reference to FIG. 5.

The second predetermined criterion may be associated with filtering out at least some body parts of the 3D avatar. The second predetermined criterion may include a criterion for filtering points for determining a boundary surface that distinguishes specific body parts in the 3D avatar. In the 3D avatar, the first points may be positioned in parts having feature points of curved surfaces, for example, between fingers, between toes, on the collarbone, below the chest, armpits, and groin. However, the simulation device 700 may determine at least a subset of body parts among all the body parts. For example, the simulation device 700 may determine body part boundary surfaces only for the armpits and groin. In this example, the first points positioned between the fingers, between the toes, on the collarbone, and below the chest may need to be filtered out. Therefore, the simulation device 700 may use the second predetermined criterion to exclude the first points present between the fingers, between the toes, on the collarbone, and below the chest from factors that determine body part boundary surfaces. For example, the second predetermined criterion may include a criterion for determining points necessary for determining an armpit boundary surface and a groin boundary surface.

The second predetermined criterion may be whether the thickness is greater than or equal to a predetermined thickness. For example, the average thicknesses of the fingers and toes to be filtered may be smaller than the average thicknesses of the armpits and the groin. In this case, the simulation device 700 may determine the predetermined thickness to be a minimum thickness of the armpit and the groin. Thus, the thicknesses of the fingers and toes are smaller than the predetermined thickness and may be filtered out.

For another example, the second predetermined criterion filters the first points by a predetermined ratio based on the thickness. The second predetermined criterion may filter out lower 20% to 30% points with the lowest thickness based on the thickness. This is because the lower 20% to 30% points with such a small thickness are highly likely to be distributed on the fingers or toes.

According to an example embodiment, the simulation device 700 may determine, as a second point, a first point that satisfies the second predetermined criterion. When the thickness corresponding to the first point satisfies the second predetermined criterion, the simulation device 700 may determine the first point as the second point.

Figure 3:
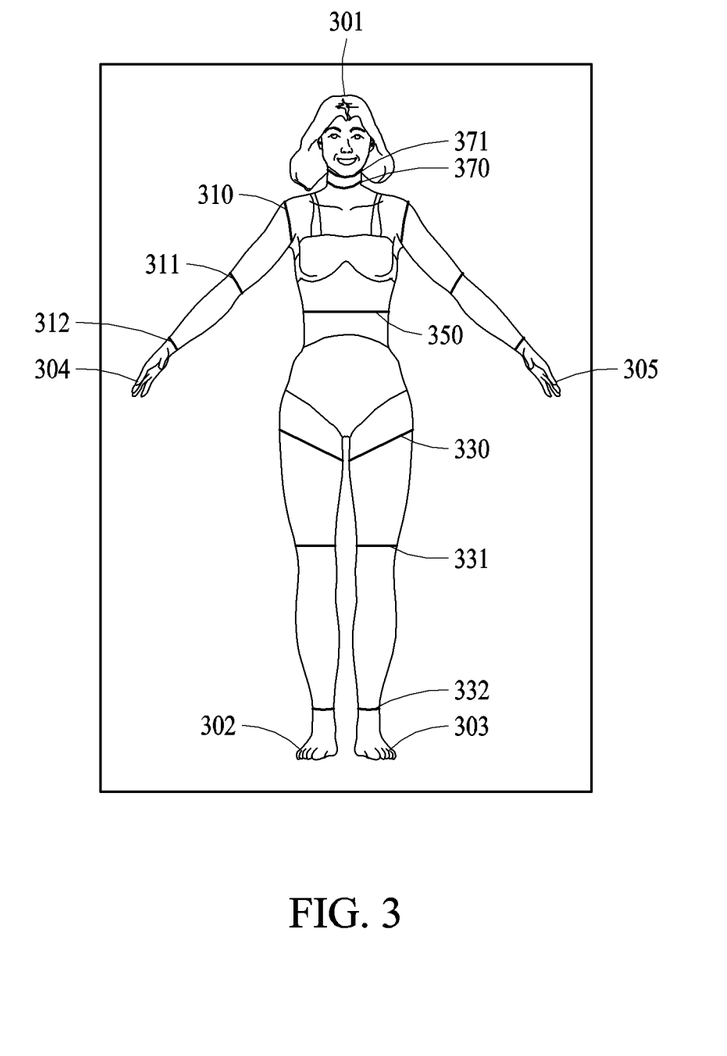
FIG. 3 is a diagram illustrating a 3D avatar for which boundary surfaces of body parts are determined, according to an example embodiment.
Figure 6:
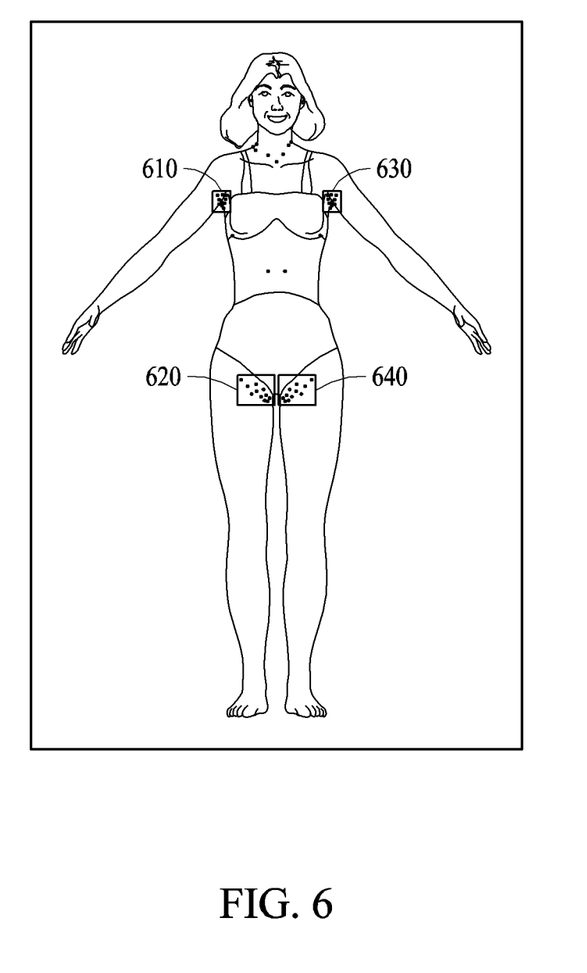
FIG. 6 is a diagram illustrating second points displayed on a 3D avatar, according to an example embodiment.

According to an example embodiment, the simulation device 700 may determine a plurality of body part boundary surfaces based on the second points. Referring to FIG. 6, second points may be distributed over a left armpit 610, a left groin 620, a right armpit 630, and a right groin 640. In this case, the simulation device 700 may determine boundary surfaces of body part based on the second points. The simulation device 700 may determine a boundary surface of a body part in a direction perpendicular to the ground, based on the second points distributed over the left armpit 610 and the right armpit 630. As shown in FIG. 3, the simulation device 700 may determine an armpit boundary surface 310 in a direction perpendicular to the ground. The simulation device 700 may also determine a boundary surface of a body part in a direction oblique to the ground, based on the second points distributed over the left groin 620 and the right groin 640. As shown in FIG. 3, the simulation device 700 may determine a groin boundary surface 330 in a direction oblique to the ground.

According to an example embodiment, the simulation device 700 may adjust a size of a 3D pattern of a garment (e.g., a basic garment) to be don on a 3D avatar based on a size of each of a plurality of boundary surfaces of body parts. For example, the simulation device 700 may decrease or increase the size of the 3D pattern of the basic garment based on a thickness of a boundary surface of body part. The simulation device 700 may maintain a size of a 2D pattern corresponding to the 3D pattern. For example, even if the simulation device 700 adjusts the size of the 3D pattern, the size of the 2D pattern corresponding to the 3D pattern may be maintained.

According to an example embodiment, the simulation device 700 may determine the boundary surfaces of body parts of the 3D avatar and generate a basic garment based on the determined boundary surfaces of body parts. The simulation device 700 may determine a boundary surface of a body part of a target avatar and generate a basic garment to be worn on the target avatar. The simulation device 700 may store basic garment wearing information of the target avatar.

Figure 2:
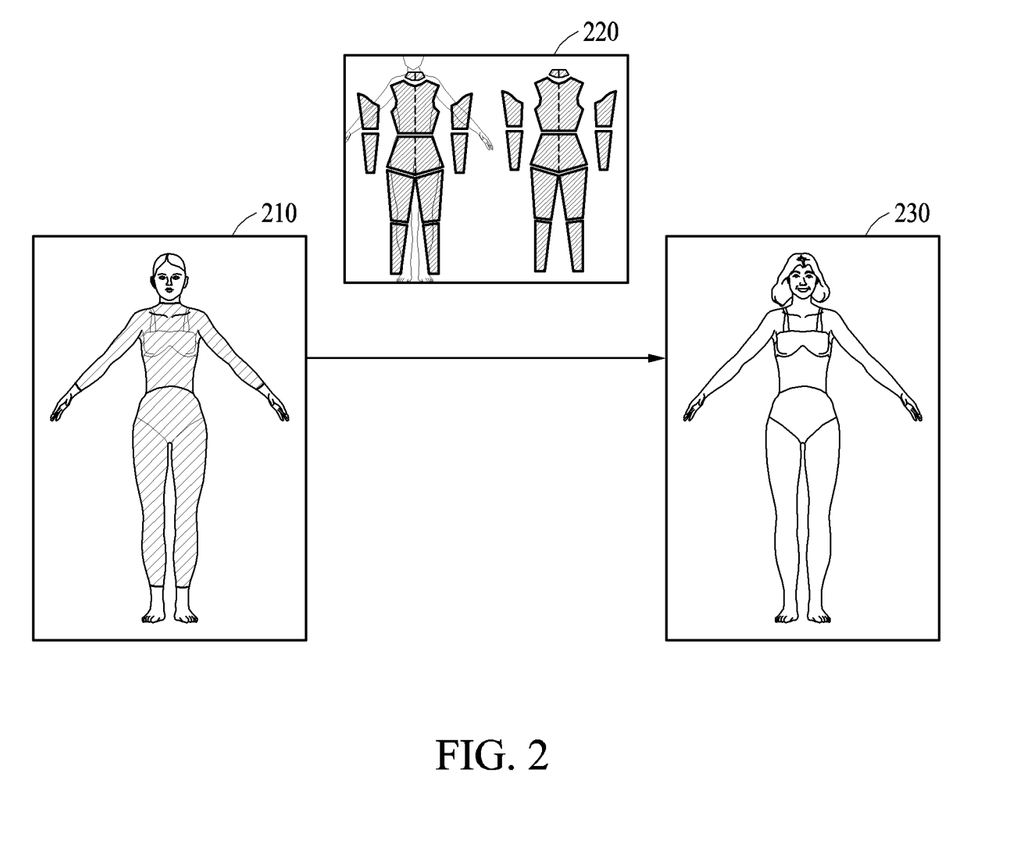
FIG. 2 is a diagram illustrating an original avatar and a target avatar wearing a basic garment, according to an example embodiment.

FIG. 2 is a diagram illustrating an original avatar and a target avatar wearing a basic garment, according to an example embodiment. FIG. 2 illustrates an original avatar 210, a basic garment 220 worn on the original avatar 210, and a target avatar 230.

According to an example embodiment, the simulation device 700 may compute a boundary surface of body part of the target avatar 230 to dress the target avatar 230 in the basic garment 220 worn on the original avatar 210. This is because a basic garment may be divided by each body part as shown in FIG. 2. Accordingly, the simulation device 700 may adjust a size of patterns of the basic garment 220 divided by each body part to dress the target avatar 230 in the basic garment 220.

FIG. 3 is a diagram illustrating a 3D avatar for which a boundary surface of a body part is determined according to an example embodiment. According to an example embodiment, the simulation device 700 may determine positions of the tips of fingers and toes of a 3D avatar. To determine the positions of the tips of the fingers and toes, the simulation device 700 may determine a posture of the 3D avatar. For example, the simulation device 700 may set the 3D avatar to take postures such as an attention posture, a T posture with arms spread out to the left and right, an A posture with both arms down, and the like.

According to an example embodiment, the simulation device 700 may search for at least one end point of a 3D avatar, starting from one point of the 3D avatar (e.g., one of vertices of a mesh constituting the 3D avatar) based on mesh information of the 3D avatar. An end point may be one of vertices of a mesh of the 3D avatar. The simulation device 700 may search for an end point farthest from a start point based on the mesh information of the 3D avatar. The start point may be a point at the highest height in the 3D avatar. For example, an end point farthest from point 1 (e.g., the start point) may be point 2. The simulation device 700 may then search for an end point farthest from the retrieved end point and the start point, starting from the retrieved end point (e.g., point 2), based on the mesh information of the 3D avatar. For example, the simulation device 700 may search for point 3 at which a sum of a distance between the retrieved point 2 and point 3 and a distance between point 1 which is the start point and point 3 is the greatest. When point 3 is retrieved, the simulation device 700 may search for point 4 at which a sum of a distance between point 4 and the retrieved point 3, a distance between point 4 and the retrieved point 2, and a distance between point 4 and point 1 is the greatest. The simulation device 700 may repeat the foregoing operation to search for a predetermined number of end points. For example, to search for four end points, the foregoing operation may be repeated four times.

According to an example embodiment, the simulation device 700 may search for an nth point. The retrieved nth point may be a point at which a sum of distances between the point and respective points from a first point which is the start point to an (n−1)th point is the greatest. For example, the nth point may be a point at which a sum of a distance between the first point and the nth point, a distance between a second point and the nth point, a distance between a third point and the nth point, . . . , and a distance between the n-lth point and the nth point is the greatest. The simulation device 700 may search for the nth point having the greatest sum of the distances between the point and the respective points from the first point to the n-lth point, using Dijkstra's algorithm.

The simulation device 700 may not recognize a position at which at least one point retrieved through the foregoing operation is present in the 3D avatar. It may be unclear which body part of the 3D avatar the retrieved end point is present. Accordingly, the simulation device 700 may identify the position of the retrieved at least one end point in the 3D avatar. The at least one end point retrieved through the foregoing operation may be end points of the 3D avatar. For example, when the start point is at the top of the head of the 3D avatar, the end points may include a left arm end point, a right arm end point, a left leg end point, a right leg end point, and the like of the 3D avatar. The simulation device 700 may determine the retrieved end points to be the left arm end point, the right arm end point, the left leg end point, the right leg end point, and the like, based on the identified positions. The simulation device 700 may identify the positions in the 3D avatar based on a sequential order in which the end points are retrieved. For example, when the 3D avatar has a general human body shape, a position farthest from the top of the head which is the start point may be the left leg end point or the right leg end point. The simulation device 700 may thus determine an initially retrieved end point or a subsequently retrieved end point to be either the left leg end point or the right leg end point. As another example, when the 3D avatar is a character with a large face, long arms, and short legs, a position farthest from the top of the head which is the start point may be the left arm end point or the right arm end point. The simulation device 700 may thus determine an initially retrieved end point or a subsequently retrieved end point to be either the left arm end point or the right arm end point.

According to an example embodiment, the simulation device 700 may search for five or more end points. For example, at least one of a wing or a tail may be attached to a 3D avatar. In this example, the simulation device 700 may search for five or more end points. For example, in a case in which a tail is attached to a 3D avatar and a start point is the top of the head of the 3D avatar, the end points may include a tail end point, a left arm end point, a right arm end point, a left leg end point, and a right leg end point. For example, a position farthest from the top of the head which is the start point may be a left tail end point. The simulation device 700 may thus search for an initially retrieved end point as the tail end point. For example, in a case in which wings are attached to a 3D avatar and a start point is the top of the head of the 3D avatar, end points may include a left wing end point, a right wing end point, a left arm end point, a right arm end point, a left leg end point, and a right leg end point. In this case, a position farthest from the top of the head which is the start point may be the left wing end point or the right wing end point. The simulation device 700 may thus determine an initially retrieved end point or a subsequently retrieved end point to be either the left wing end point or the right wing end point. For another example, in a case in which wings and a tail are attached to a 3D avatar, there may be seven or more end points.

According to an example embodiment, when a start point is at the top of the head of a 3D avatar, the simulation device 700 may search for end points 302, 303, 304, and 305, starting from a point 301 corresponding to the top of the head of the 3D avatar, based on mesh information of the 3D avatar. The simulation device 700 may search for a point farthest from the point 301 corresponding to the top of the head of the 3D avatar. A surface of the 3D avatar may be formed with a plurality of meshes. Accordingly, the simulation device 700 may search for the point farthest from the point 301 corresponding to the top of the head based on the mesh information (e.g., a mesh connection relationship). For example, the simulation device 700 may search for the point farthest from the point 301 corresponding to the top of the head, using Dijkstra's algorithm. In this example, when the point farthest from the point 301 corresponding to the top of the head is the first end point 302, the simulation device 700 may search for the second end point 303 at which a sum of a distance between the start point 301 and the second end point 303 and a distance between the first end point 302 and the second end point 303 is the greatest. Accordingly, the simulation device 700 may obtain the end points 302 and 303.

According to an example embodiment, the simulation device 700 may search for the third end point 304, starting from the second end point 303, based on the mesh information. For example, the simulation device 700 may search for the third end point 304 at which a sum of a distance between the second end point 303 and the third end point 304, a distance between the first end point 302 and the third end point 304, and a distance between the start point 301 and the third end point 304, starting from the second end point 303, is the greatest. The simulation device 700 determine the fourth end point 305 at which a sum of a distance between the third end point 304 and the fourth end point 305, a distance between the second end point 303 and the fourth end point 305, a distance between the first end point 302 and the fourth end point 305, and a distance between the start point 301 and the fourth end point 305, starting from the third end point 304, is the greatest. The simulation device 700 may identify positions on the 3D avatar respectively corresponding to the retrieved first end point 302, the retrieved second end point 303, the retrieved third end point 304, and the retrieved fourth end point 305. For example, the simulation device 700 may identify the first end point 302 as a right leg end point, the second end point 303 as a left leg end point, the third end point 304 as a right arm end point, and the fourth end point 305 as a left arm end point.

According to an example embodiment, the simulation device 700 may determine a segment that is a body part of a 3D avatar, based on at least one end point and at least one of a plurality of boundary surfaces of body parts. For example, as shown in FIG. 3, the simulation device 700 may determine an arm segment based on the end point 304 and the armpit boundary surface 310. The simulation device 700 may also determine a leg segment based on the end point 302 and the groin boundary surface 330. Similarly, the simulation device 700 may determine a right arm segment, a left arm segment, a right leg segment, and a left leg segment, respectively. A segment described herein may be at least part of a 3D avatar.

According to an example embodiment, the simulation device 700 may determine at least one boundary surface of body part in a segment based on body proportion information. For example, in the arm segment determined based on the second end point 304 and the armpit boundary surface 310, the simulation device 700 may determine an elbow boundary surface 311 and/or a wrist boundary surface 312 based on the body proportion information. In the arm segment, the length of an arm, the length of a forearm, and the length of an upper arm may be determined based on a position of a wrist and a position of an elbow, and a length ratio of each may be determined. In this example, the body proportion information may include ratio information of arm length:forearm length:upper arm length. For example, a body part boundary surface in the arm segment may be a surface cut perpendicular to a medial axis. In general, unlike the legs, the arms of a 3D avatar may form various angles with the torso. For example, an angle formed between the arms and the torso when the 3D avatar takes an attention posture and an angle formed between the arms and the torso when the 3D avatar takes a posture with both arms spread may be different, and thus the simulation device 700 may inaccurately determine an arm boundary surface when it determines the boundary surface in a direction parallel to the ground. Accordingly, since the arms of the 3D avatar may take various positions, the simulation device 700 may determine, to be a boundary surface, a surface cut perpendicular to the medial axis of the arm segment.

As another example, in the leg segment determined based on the end point 302 and the groin boundary surface 330, the simulation device 700 may determine a knee boundary surface 331 and/or an ankle boundary surface 332 based on the body proportion information. In the leg segment, the height of a foot, the length of a calf, and the length of a thigh may be determined based on the positions of a knee and an ankle, and a length ratio of each may be determined. For example, a boundary surface of body part in the leg segment may be a surface cut in a direction parallel to the ground. In this example, the ground is a surface on which the 3D avatar is supported to stand and may be a surface on which the feet of the 3D avatar are positioned. In general, when the 3D avatar is standing, the legs of the 3D avatar may be in a stretched state, and thus the simulation device 700 may obtain an accurate boundary surface even if the surface is cut in the direction parallel to the ground.

According to an example embodiment, the simulation device 700 may determine a waist boundary surface 350 based on the body proportion information. The body proportion information may include, for example, ratio information relating to a waist boundary surface.

According to an example embodiment, the simulation device 700 may determine at least one boundary surface of body part corresponding to a neck of a 3D avatar among a plurality of cross sections parallel to a cross section determined based on shoulder position information of the 3D avatar. The simulation device 700 may determine the cross section based on the shoulder position information of the 3D avatar. In addition, the simulation device 700 may generate the plurality of cross sections parallel to the corresponding cross section, while increasing the height starting from a cross section positioned on a shoulder (e.g., a lower neck boundary surface) of the 3D avatar. In this process, the simulation device 700 may determine a lower neck boundary surface 370 and an upper neck boundary surface 371. When it generates the cross sections while increasing the height, the thickness may abruptly increase in a face area after being thinned. In this case, the simulation device 700 may determine a position before the thickness has suddenly increased to be the upper neck boundary surface 371.

According to another embodiment, the simulation device 700 may determine at least one boundary surface of body part corresponding to the neck of the 3D avatar among a plurality of cross sections parallel to a cross section determined based on face position information of the 3D avatar. The simulation device 700 may determine the cross section based on the face position information of the 3D avatar. In addition, the simulation device 700 may generate the plurality of cross sections parallel to the corresponding cross section while decreasing the height starting from a cross section (e.g., an upper neck boundary surface) positioned directly below a face of the 3D avatar. In this process, the simulation device 700 may determine the lower neck boundary surface 370 and the upper neck boundary surface 371. When it generates the cross section while decreasing the height, the thickness may abruptly increase in a shoulder area while gradually increasing. In this case, the simulation device 700 may determine a position before the thickness has suddenly increased to be the lower neck boundary surface 370.

Figure 4:
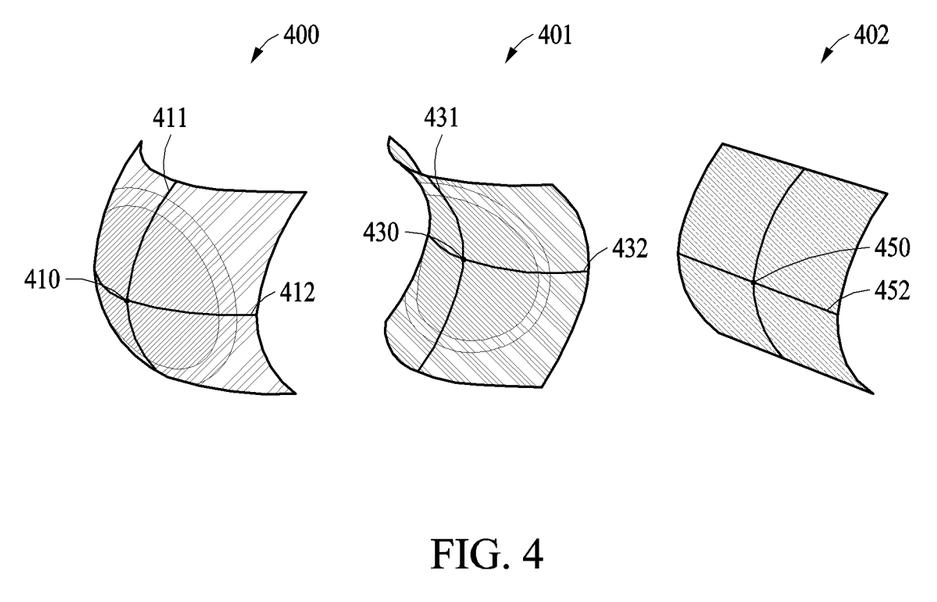
FIG. 4 is a diagram illustrating curvature information, according to an example embodiment.

FIG. 4 is a diagram illustrating curvature information according to an example embodiment. FIG. 4 illustrates a case 400 in which a Gaussian curvature at one point 410 is a positive value, a case 401 in which a Gaussian curvature at one point 430 is a negative value, and a case 402 in which a Gaussian curvature at one point 450 is zero (0).

Curvature information may indicate a Gaussian curvature. The Gaussian curvature is a measure indicating a degree of curvature at one point on a curved surface. The Gaussian curvature may be determined by a multiplication of a first curvature and a second curvature. The first curvature and the second curvature may each be a principal curvature. The principal curvature may be a value indicating a degree of how curved a curved surface is along each direction. On a curved surface, an infinite number of normal curvatures may be present. A normal curvature may refer to a curvature of a curved line obtained from one point on a curved surface by cutting the curved surface by a plane including a normal, in a corresponding direction. The first curvature and the second curvature may be the greatest curvature and the smallest curvature among the infinite number of normal curvatures. For example, the first curvature may be the greatest curvature and the second curvature may be the smallest curvature. A direction of the first curvature and a direction of the second curvature may be perpendicular to each other.

FIG. 4 illustrates the case 400 in which the Gaussian curvature at one point 410 is a positive value. A curved line 411 corresponding to the first curvature and a curved line 412 corresponding to the second curvature are convex in the same direction, and thus the signs of the principal curvatures may be the same. In addition, the Gaussian curvature is a multiplication of the first curvature and the second curvature, and thus the Gaussian curvature may be a positive value. When the Gaussian curvature is positive, a curved surface at the point 410 may be convex or concave.

FIG. 4 illustrates the case 401 in which the Gaussian curvature at one point 430 is a negative value. A curved line 431 corresponding to the first curvature and a curved line 432 corresponding to the second curvature may be convex in different directions. For example, the curved line 431 corresponding to the first curvature may be convex upward, and the curved line 432 corresponding to the second curvature may be convex downward. In this example, the signs of the first curvature and the second curvature are opposite, and thus the Gaussian curvature may be a negative value. When the Gaussian curvature is negative, the point 430 may be a saddle point.

FIG. 4 illustrates the case 402 in which the Gaussian curvature at one point 450 is zero (0). A line 452 corresponding to the second curvature may be a straight line without a curvature. In this case, the second curvature is 0, and thus the Gaussian curvature may be 0.

Figure 5:
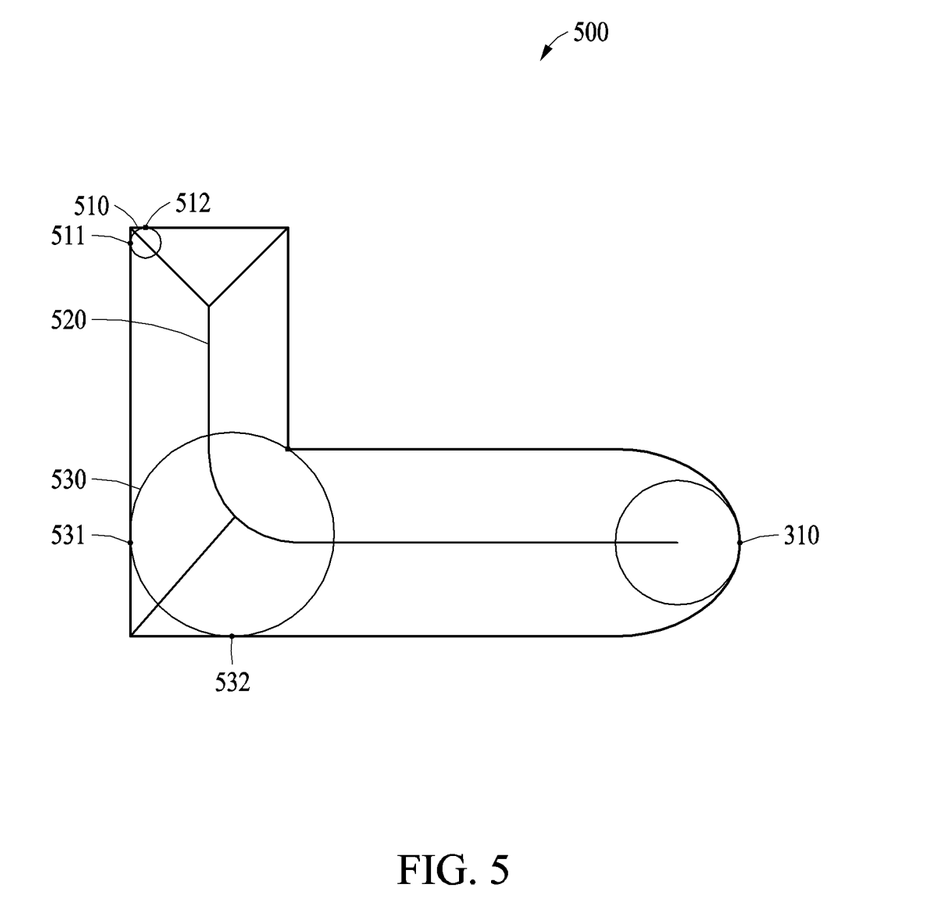
FIG. 5 is a diagram illustrating thickness information, according to an example embodiment.

FIG. 5 is a diagram illustrating thickness information according to an example embodiment. FIG. 5 illustrates circles present on a surface of an object and inside the object. Although they are illustrated two-dimensionally for the convenience of description, the object may be a 3D avatar, and the circle inside the object may be a sphere present inside the 3D avatar. For example, what is illustrated two-dimensionally in FIG. 5 may be cross sections of a 3D avatar and spheres present inside the 3D avatar.

FIG. 5 illustrates a portion 500 of a 3D avatar, sphere 510, contact point 511, contact point 512, sphere 530, contact point 531, contact point 532, and a medial axis 520. Here, sphere 510 and sphere 530 may include at least one contact point that is positioned inside the portion 500 of the 3D avatar and contacts a surface of the 3D avatar. In addition, sphere 510 and sphere 530 may each generate a sphere that maximally contacts inside the avatar. The largest contacting sphere is a sphere of having a size that fits inside a part of the 3D point and increasing the size further would protrude beyond the avatar. For example, sphere 510 may be in contact with the surface of the 3D avatar at contact point 1 511 and contact point 2 512. For another example, sphere 2 530 may be in contact with the surface of the 3D avatar at contact point 531 and contact point 532.

Inside the 3D avatar, at least one largest contacting sphere may be generated. In addition, by connecting the centers of maximally contacting spheres, the medial axis 520 may be generated as shown in FIG. 5. According to an example embodiment, the simulation device 700 may determine a thickness based on a distance (e.g., a radius of a sphere) from a medial axis to a contact point. The simulation device 700 may calculate the thickness of a specific body part of a 3D avatar, using the distance from the medial axis to the contact point. For example, the simulation device 700 may determine a value twice the radius of the sphere to be the thickness or may determine a value obtained by multiplying the radius of the sphere by a predetermined ratio to be the thickness.

FIG. 6 is a diagram illustrating second points displayed on a 3D avatar according to an example embodiment. What has been described above with reference to FIG. 1 may apply to FIG. 6, and a more detailed description of FIG. 6 will thus be omitted here.

Figure 7:
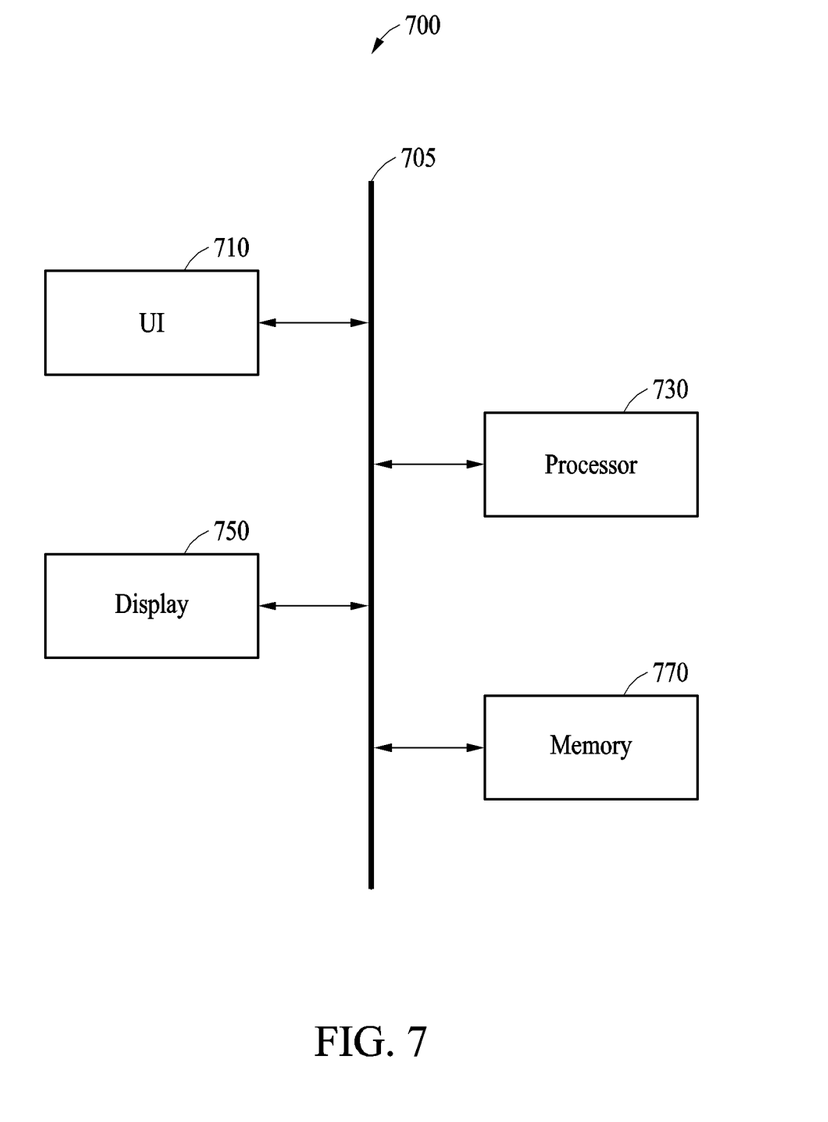
FIG. 7 is a diagram illustrating a simulation device according to various example embodiments.

FIG. 7 is a diagram illustrating a simulation device according to various example embodiments. According to an example embodiment, the simulation device 700 may be a server and a user terminal (e.g., a smartphone, a personal computer (PC), a tablet PC, etc.). Referring to FIG. 7, the simulation device 700 may include a user interface (UI) 710, a processor 730, a display 750, and a memory 760. The UI 710, the processor 730, the display 750, and the memory 760 may be connected through a communication bus 705.

The UI 710 may receive a user input that selects at least one of one or more pattern pieces included in a 3D garment and patterns (2D patterns) constituting each of the pattern pieces from the 3D garment simulated as being worn on an avatar. For example, the UI 710 may receive a user input for a 3D garment, a pattern piece, and/or a pattern displayed in a 3D space through, for example, a stylus pen, a mouse click, and/or a touch input made by a user's finger.

The UI 710 may also receive a user input for an empty space other than a plurality of objects in a simulation space in which a plurality of objects (e.g., a 3D avatar, a 3D garment, etc.) is displayed.

The processor 730 may activate and visualize the selected pattern piece and/or pattern. The processor 730 may also inactivate at least one remaining pattern piece and/or pattern other than the selected pattern piece and/or pattern to visualize it transparently or translucently.

The display 750 may display a 3D avatar generated by the processor 730.

The memory 760 may store information associated with the generated 3D avatar, garment information, and the like. The memory 760 may also store various pieces of information generated in the processing process of the processor 730 described above. The memory 760 may also store various pieces of data and programs. The memory 760 may include a volatile memory or a non-volatile memory. The memory 760 may include a high-capacity storage medium such as a hard disk to store various pieces of data.

In addition, the processor 730 may perform at least one of the methods described above with reference to FIGS. 1 to 6 or an algorithm corresponding to the at least one method. The processor 730 may be a hardware-implemented data processing device having a physically structured circuit to execute desired operations. The desired operations may include, for example, code or instructions included in a program. The processor 730 may be implemented as, for example, a central processing unit (CPU), a graphics processing unit (GPU), or a neural network processing unit (NPU). For example, the hardware-implemented simulation device 700 may include, for example, a microprocessor, a CPU, a processor core, a multi-core processor, a multiprocessor, an application-specific integrated circuit (ASIC), and a field-programmable gate array (FPGA).

The processor 730 may execute the program and control the simulation device 700. The code of the program to be executed by the processor 730 may be stored in the memory 760.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described hardware devices may be configured to act as one or more software modules in order to perform the operations of the above-described example embodiments, or vice versa.

Software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

The invention claimed is:

1. A method of determining a body part boundary surface of a three-dimensional (3D) avatar executed by one or more processors coupled to memory to read instructions from the memory, the method comprising:
generating curvature information indicating a curvature of each of a plurality of vertices forming a surface mesh of the 3D avatar;
determining, among the plurality of vertices, first points at which a curvature satisfies a first predetermined criterion based on the curvature information;
determining second points among the first points based on whether a thickness at each of the first points satisfies a second predetermined criterion;
determining a plurality of boundary surfaces of body parts of the 3D avatar based on the second points;
automatically adjusting sizes of patterns of a garment based on the plurality of boundary surfaces of the body parts of the 3D avatar; and
simulating draping of the garment with the size of the patterns adjusted on the 3D avatar.

2. The method of claim 1, wherein the curvature information indicates Gaussian curvature determined by a multiplication of a first curvature along a first direction and a second curvature in a second direction.

3. The method of claim 1, wherein the first predetermined criterion is whether a Gaussian curvature at each of the first points is a negative value.

4. The method of claim 1, wherein the thickness indicates a radius of a sphere positioned inside the 3D avatar and contacting at least a surface of the 3D avatar.

5. The method of claim 1, wherein the second predetermined criterion indicates whether the thickness is greater than or equal to a predetermined value.

6. The method of claim 1, wherein a subset of the first points at which the thickness is greater than or equal to a predetermined thickness is determined as the second points.

7. The method of claim 1, further comprising:
searching for at least one end point, starting from a start point of the 3D avatar, based on mesh information of the 3D avatar before generating of the curvature information.

8. The method of claim 7, further comprising:
determining a segment that is a body part of the 3D avatar, based on the at least one end point and at least one of the plurality of boundary surfaces of body parts of the 3D avatar.

9. The method of claim 8, further comprising:
determining at least one body part boundary surface in the segment based on body proportion information.

10. The method of claim 1, further comprising:
determining at least one boundary surface of a body part corresponding to a neck of the 3D avatar among a plurality of cross sections parallel to a cross section based on shoulder position of the 3D avatar; or
determining the at least one boundary surface of the body part corresponding to the neck of the 3D avatar among a plurality of cross sections parallel to a cross section based on face position of the 3D avatar.

11. The method of claim 1, further comprising:
maintaining a size of a two-dimensional (2D) pattern corresponding to the 3D pattern regardless of adjusting the size of the 3D pattern.

12. A computing device, comprising:
one or more processors; and
memory storing instructions thereon, the instructions when executed by the one or more processors to:
generate curvature information indicating a curvature of each of a plurality of vertices forming a surface mesh of a 3D avatar,
determine, among the plurality of vertices, first points at which a curvature satisfies a first predetermined criterion based on the curvature information;
determine second points among the first points based on whether a thickness at each of the first points satisfies a second predetermined criterion;
determine a plurality of boundary surfaces of body parts of the 3D avatar based on the second points;
automatically adjust sizes of patterns of a garment based on the plurality of boundary surfaces of the body parts of the 3D avatar; and
simulate draping of the garment with the size of the patterns adjusted on the 3D avatar.

13. A non-transitory computer readable medium storing instructions thereon, the instructions when executed by one or more processors cause the one or more processors to:

generate curvature information indicating a curvature of each of a plurality of vertices forming a surface mesh of a 3D avatar;

determine, among the plurality of vertices, first points at which a curvature satisfies a first predetermined criterion based on the curvature information;

determine second points among the first points based on whether a thickness at each of the first points satisfies a second predetermined criterion;

determine a plurality of boundary surfaces of body parts of the 3D avatar based on the second points;

automatically adjust sizes of patterns of a garment based on the plurality of boundary surfaces of the body parts of the 3D avatar; and simulate draping of the garment with the size of the patterns adjusted on the 3D avatar.

14. The non-transitory computer readable medium of claim 13, wherein the curvature information indicates Gaussian curvature determined by a multiplication of a first curvature along a first direction and a second curvature in a second direction.

15. The non-transitory computer readable medium of claim 13, wherein the first predetermined criterion is whether a Gaussian curvature at each of the first points is a negative value.

16. The non-transitory computer readable medium of claim 13, wherein the thickness indicates a radius of a sphere positioned inside the 3D avatar and contacting at least a surface of the 3D avatar.

17. The non-transitory computer readable medium of claim 13, wherein the second predetermined criterion indicates whether the thickness is greater than or equal to a predetermined value.

18. The non-transitory computer readable medium of claim 13, wherein a subset of the first points at which the thickness is greater than or equal to a predetermined thickness is determined as the second points.

19. The non-transitory computer readable medium of claim 13, further comprising:

searching for at least one end point, starting from a start point of the 3D avatar, based on mesh information of the 3D avatar before generating of the curvature information.

* * * * *